United States Patent
Piou et al.

(10) Patent No.: US 8,720,597 B2
(45) Date of Patent: May 13, 2014

(54) ROLLER ASSEMBLY FOR AGRICULTURAL MACHINERY

(75) Inventors: Denis Piou, Villeblevin (FR); Daniel Martin Cabanas, St Germain Laval (FR)

(73) Assignee: OTICO, Chalmaison (FR)

( * ) Notice: Subject to any disclaimer, the term of this patent is extended or adjusted under 35 U.S.C. 154(b) by 324 days.

(21) Appl. No.: 13/222,659

(22) Filed: Aug. 31, 2011

(65) Prior Publication Data

US 2012/0077656 A1    Mar. 29, 2012

(30) Foreign Application Priority Data

Sep. 3, 2010    (FR) ...................................... 10 03521

(51) Int. Cl.
*A01B 29/04*    (2006.01)

(52) U.S. Cl.
USPC ............................ 172/572; 172/537; 172/519

(58) Field of Classification Search
USPC .......... 172/518, 519, 537, 572; 404/122, 123, 404/126, 131, 132
See application file for complete search history.

(56) References Cited

U.S. PATENT DOCUMENTS

| | | | | |
|---|---|---|---|---|
| 1,351,996 A | * | 9/1920 | Corte | 280/124.109 |
| 2,270,390 A | * | 1/1942 | Summers | 404/126 |
| 2,404,535 A | * | 7/1946 | Schmeiser | 384/587 |
| 2,407,965 A | * | 9/1946 | Smith | 404/122 |
| 2,796,712 A | * | 6/1957 | Miller et al. | 172/572 |
| 2,983,204 A | * | 5/1961 | Floden | 404/132 |
| 3,091,297 A | * | 5/1963 | Matteoli et al. | 172/546 |
| 4,776,404 A | * | 10/1988 | Rogers et al. | 172/21 |
| 4,905,771 A | * | 3/1990 | Stark | 172/572 |
| 5,158,145 A | * | 10/1992 | Karchewski | 172/548 |
| 5,203,585 A | * | 4/1993 | Pierce | 280/124.116 |
| 5,275,430 A | * | 1/1994 | Smith | 280/6.151 |
| 6,695,069 B2 | * | 2/2004 | Rozendaal | 172/601 |
| 7,124,835 B2 | * | 10/2006 | Piou | 172/539 |
| 7,168,718 B2 | * | 1/2007 | Svartz | 280/124.13 |

FOREIGN PATENT DOCUMENTS

| | | |
|---|---|---|
| EP | 1 380 198 A1 | 1/2004 |
| EP | 1 856 963 A1 | 11/2007 |
| FR | 2 676 325 | 11/1992 |
| WO | WO 2007/123479 A1 | 11/2007 |

OTHER PUBLICATIONS

French Preliminary Search Report issued Apr. 12, 2011, in French 10 03521, filed Sep. 3, 2010 (with English Translation of Category of Cited Documents).

* cited by examiner

*Primary Examiner* — Matthew D Troutman
(74) *Attorney, Agent, or Firm* — Oblon, Spivak, McClelland, Maier & Neustadt, L.L.P.

(57) ABSTRACT

A roller assembly for agricultural machinery is disclosed. The roller assembly includes at least one tube onto which tires are threaded, and two arms adapted to support the tube in rotation at both its ends. Each arm carries a suspension lever housed inside the tube and acted upon by a resilient recoil member. The suspension lever is mounted on the arm so as to be pivotable about a first rotation axis and supporting a shaft end which carries a flange fixed to the inside of the tube for the rotation of this tube about a second rotation axis parallel to the first rotation axis. The roller assembly applies particularly to the rollers of seed drills.

15 Claims, 4 Drawing Sheets

ROLLER ASSEMBLY FOR AGRICULTURAL MACHINERY

BACKGROUND OF THE INVENTION

1. Field of the Invention

The invention relates to a roller assembly intended for agricultural machinery.

2. Description of the Related Art

The rollers of agricultural machinery are conventionally combined with various tools or machines, such as tools for working the soil, seed drills, etc. Most frequently, a machine of this kind comprises a combination of tools carried at the back of a tractor and followed by a roller. The roller serves particularly to press down the soil that has previously been worked by the tools and to regulate the working depth of the tools.

There are numerous types of roller, ranging from the traditional roller consisting of a metal cylinder to more recent rollers which comprise flexible annular elements, such as tyres, treads or the like, threaded on a tube that is rotatably mounted about an axle. They may be, for example, inflated tyres or non-inflated tyres of the semi-hollow type.

The invention relates more particularly to a roller assembly for agricultural machinery, comprising at least one tube around which are threaded pneumatic tyres, as well as two supports adapted to support the tube in rotation about an axle at both ends.

A roller assembly of this type is known particularly from the publication FR-A-2 841 733 in the name of the Applicant. In this known roller assembly the tyres are of the semi-hollow type. They are threaded directly around the tube and are not inflated, thus giving them a certain flexibility. They generally have a dome-shaped profile which enables them to produce furrows in the soil, for example in order to sow seeds using a seed drill arranged at the back of the roller. Moreover, this known assembly is fitted with a braking system for exerting a resistant torque between the tube and the frame of the machine carrying the roller assembly.

Roller assemblies of this kind are complex in design owing to the fact that the rollers have to be capable of advancing on open ground on land that is often irregular, strewn with stones or other debris, and also of travelling on roads, the carriageways of which may have very different profiles, at speeds of possibly up to 40 km/h.

It is common to pair two rollers substantially in axial alignment to enable these two rollers to have different rotational velocities in the event of turning, thus making it easier to turn while reducing friction. In fact it is preferable to have, for example, two rollers 1.5 meters wide rather than one roller 3 meters wide.

Thus, in every case, the roller assembly has to be able to adapt to the irregularity of the ground and the profile of the carriageway of the road on which it is travelling. It is also known for this purpose to provide shock absorbers, as taught by the publication FR-A-2 861 252 in the name of the Applicant. However, these shock absorbers are suitable for narrow rollers and substantially increase the vertical distance and hence the bulk between the roller itself and the frame of the machine.

BRIEF SUMMARY OF THE INVENTION

The invention sets out in particular to overcome the above-mentioned drawbacks.

To this end it proposes a roller assembly as defined hereinbefore, wherein each arm carries a suspension lever housed inside the tube and acted upon by a resilient recoil member, and wherein the suspension lever is mounted on the arm so as to be pivotable about a first rotation axis and supports a shaft end which carries a flange fixed to the inside of the tube for the rotation of this tube about a second rotation axis parallel to the first rotation axis.

In this way a roller assembly is obtained wherein the or each roller that forms it is equipped, at both ends, with suspension means housed inside the tube around which the tyres are threaded. This results in a roller assembly which is not only capable of adapting to the irregularities of the ground that is to be worked or the carriageway along which the roller assembly is to advance, but also provides a particularly compact arrangement of the suspension means.

This makes it possible in particular to reduce the height between the rotation axis of the roller and the support frame of the machine which is arranged above the roller.

This results in a more compact design and a mechanical simplification of the roller assembly.

The roller assembly may comprise either a single roller or two rollers arranged substantially in alignment with one another, to assist with turning.

The tube may receive different types of tyres, the term "tyre" being meant in the wider sense.

They may be in particular inflated or non-inflated tyres, treads, of flat or convex profile.

In the invention tyres with a dome-shaped profile are preferably used, notably tyres of the semi-hollow type.

These tyres with a dome-shaped profile have the advantage of being able to produce parallel furrows in the ground.

Also, these tyres may be threaded onto the tube either directly or via rims.

In a roller assembly according to the invention, the or each roller is mounted to be freely rotatable. It is possible in certain cases to provide a braking device, also housed inside the tube, when the mass of the machine equipped with the roller assembly exceeds a certain defined threshold.

BRIEF DESCRIPTION OF THE SEVERAL VIEWS OF THE DRAWINGS

In the following description, which is provided solely by way of example, reference is made to the attached drawings, wherein.

DETAILED DESCRIPTION OF THE INVENTION

Figure 1:
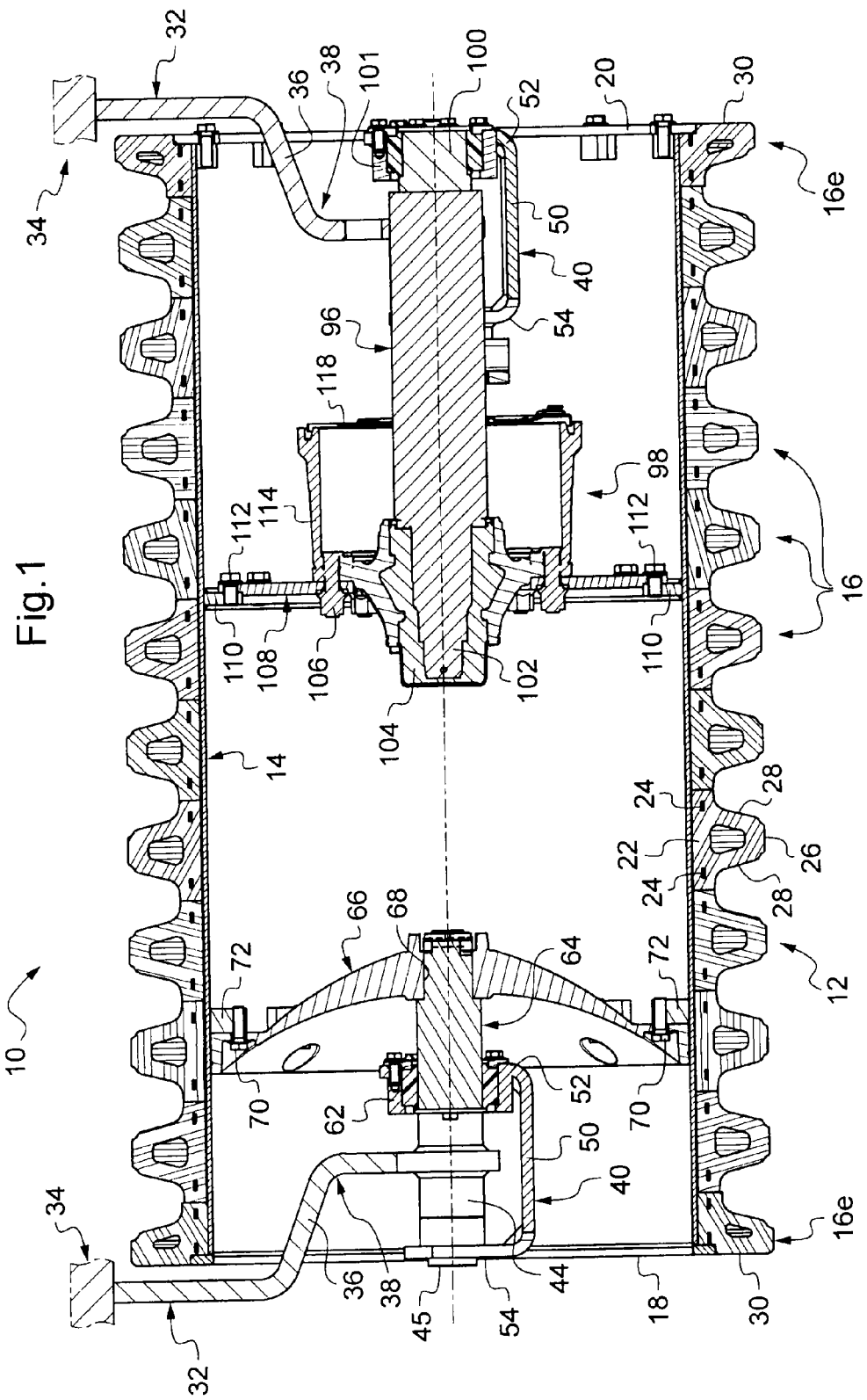
FIG. 1 is an axial section through a roller assembly according to the invention comprising a single roller equipped with tyres of the semi-hollow type and also provided with braking means, the plane of the section passing through the rotation axis of the roller.

Reference is made to FIG. 1 which shows a roller assembly 10 intended for an agricultural machine and comprising a single roller 12, for example a roller for a seed drill. The roller 12 comprises a tube 14 mounted to be freely rotatable, on which are threaded a series of identical pneumatic tyres 16. These tyres are stacked to be adjacent to one another and are held between two end rings 18 and 20 firmly secured to the tube 14 to ensure that the series of tyres is held and clamped in the axial direction. In the embodiment shown the ring 18 is integrally connected to the tube 14, for example by welding, whereas the ring 20 is removably attached to the tube 14 by screws. However, according to an alternative feature, it is also possible to fix the rings 18 and 20 so that they are removable. At least one of the rings 18 and 20 has to be removable so that the tyres can be fitted or replaced. In the embodiment under consideration, the tyres 16 are tyres of the semi-hollow type as taught by the publication FR-A-2 763 279 in the name of the Applicant.

Briefly, it will be recalled that a tyre of this kind has a part 22 forming a sheath that bears against the outer surface of the tube 14. The part 22 forming the sheath is reinforced here by two circular reinforcements 24 and it is connected to a part 26 forming the tyre tread via two opposite sidewalls 28 arranged at a sloping angle (FIG. 1). This tyre defines a hollow uninflated annular space able to communicate with the ambient medium via an opening (not shown) which, in use, serves to equilibrate pressures.

The tyres 16 are identical to one another, with the exception of the end tyres 16e, the profile of which is truncated and comprises only a single sloping sidewall 28, analogous to those of the normal tyres, and a straight sidewall 30 that extends perpendicularly to the axis of the roller and the outer side. It will be understood that using these tyres it is possible to produce furrows parallel to one another in the ground which are identical in profile, with the exception of the two end tyres 16e. As indicated previously, the invention is not limited to this type of semi-hollow tyres. Other types of tyres may be used, either inflated or uninflated, with different profiles. Moreover, it is possible to mount these tyres not directly around the tube 14 as in the example shown but also via rims. It is also possible to place a spacer between every two successive tyres.

The assembly 10 comprises two arms 32 connected to a frame 34, diagrammatically shown, of the agricultural machine in question. In the embodiment shown the arms 32 are produced in the form of generally vertical uprights, the lower part of which forms a double elbow 36 and terminates in an end branch 38, the structure of which will be described hereinafter. Each arm 32 is deflected or offset towards the inside of the tube 14, in the axial direction of the tube, in a region (lower part of the arm) that carries a suspension lever 40 housed inside the tube 14, the structure of which will be described in detail with reference to FIGS. 2 and 3.

Figure 2:
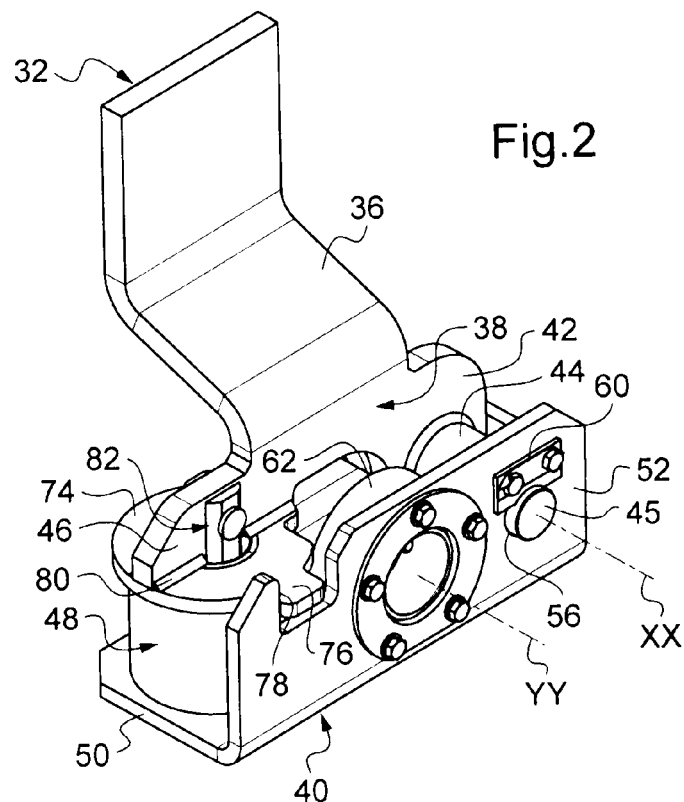
FIG. 2 is a perspective view of the lower part of an arm carrying a suspension lever and a resilient recoil member.

FIG. 2 shows the lower part of an arm 32 with its end branch 38 and the double elbow 36. This is the arm 32 on the left-hand side of FIG. 1. The end branch 38 is elongate in shape and is arranged generally horizontally. It has a first end 42 carrying a sleeve 44, through which a pivot shaft 45 (also referred to as a pivot) passes, which extends in a generally horizontal direction along a first rotation axis XX. The sleeve 44 is firmly attached at the end 42, for example by welding, and the pivot shaft 45 passes through it, thus enabling a relative rotational movement between the sleeve 44 and the pivot shaft 45 about the axis XX. Thus, the pivot shaft 45 also passes through the end branch 38. This end branch 38 has a second end 46 connected to a resilient recoil member 48 which bears on the suspension lever 40 at a spacing from the axis XX.

In the embodiment shown, the suspension lever 40 is in the form of a beam of generally U-shaped section with a core 50 generally oblong and rectangular in shape and two wings 52 and 54 which are connected perpendicularly to the core 50. The core 50 is generally horizontal, whereas the wings 52 and 54 are generally vertical. The wing 52 extends over the entire length of the core 50, whereas the wing 54 is shorter, as can be seen more easily in FIG. 3.

Figure 3:
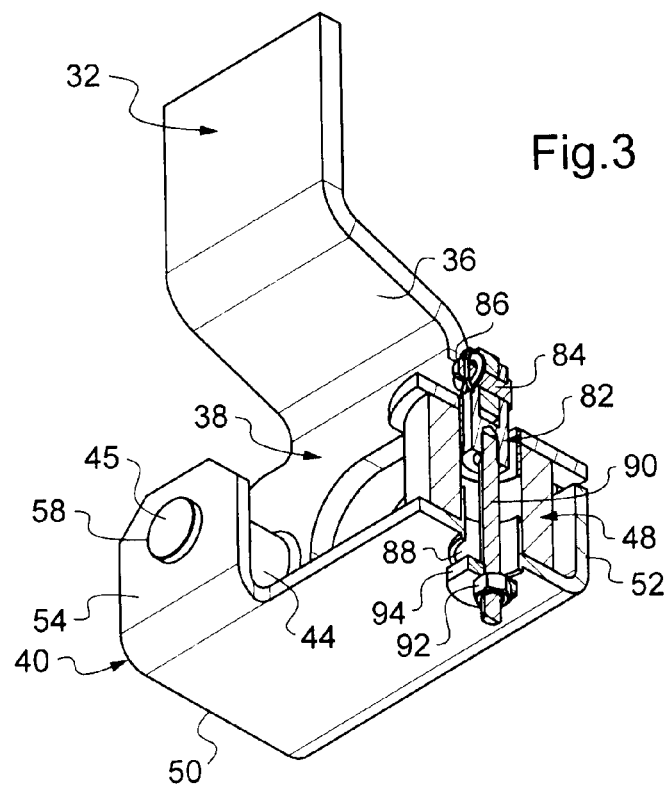
FIG. 3 is a perspective view analogous to FIG. 2, with a section showing the structure of a tie-rod passing through the resilient recoil member.

The sleeve 44 is accommodated between the wings 52 and 54. The pivot shaft 45 has two opposite ends which extend beyond the sleeve 44 and are accommodated in two respective circular openings 56 in the wing 52 (FIG. 2) and 58 in the wing 54 (FIG. 3). A stop plate 60 fixed to the wing 52 (FIG. 2) prevents translational and rotational movement of the pivot shaft 45 relative to the suspension lever 40. The suspension lever 40 is thus pivotably mounted on the arm 32 about the axis XX.

The wing 52 also carries a bearing 62 (FIGS. 1, 2 and 3) which allows free rotation of a shaft end 64 (FIG. 1) about a second rotation axis YY parallel to the first rotation axis XX.

In FIG. 1, the axes XX and YY (left-hand side of FIG. 1) appear to be in alignment but are actually offset relative to the plane of the Figure, if FIG. 1 is viewed in conjunction with FIGS. 2 and 3. In fact, the axis YY is in the plane of FIG. 1, whereas the axis XX is behind this plane. As can be seen from FIG. 1, the wing 54 is practically located in the plane of the end ring 18, whereas the wing 52 is offset towards the inside of the tube 14 by a distance corresponding substantially to the width of the core 40, thus enabling the shaft end 64 to be offset towards the inside of the tube 14.

The shaft end 64, rotatably mounted on the suspension lever 40, is firmly attached to a flange 66 produced in the form of a cast iron dish. The shaft end is keyed in a central opening 68 of the flange 66 and the latter is attached at its periphery by a series of circumferentially spaced bolts 70 to respective lugs 72 welded to the inside of the tube 14. In an alternative embodiment these lugs could be replaced by a continuous ring. This enables the flange 66 to be removably fixed to the inside of the tube 14.

The resilient recoil member 48 will now be described more particularly by reference to FIGS. 2 and 3. This member consists, in this embodiment, of a body made of an elastic material of the rubber type in generally cylindrical form. This cylinder bears, on the one hand, on the inner surface of the wing 50 and, on the other hand, on a washer 74 provided with a radial tab 76 adapted to engage in a cut-out 78 in one of the wings of the suspension lever 40, namely the wing 52 in this case. The washer 74 is welded to the cross-section of the end branch 38, at its second end 46, by weld ribbons 80. The tab 76 thus forms a first abutment for the resilient recoil member 48.

Moreover, a tie-rod 82 is interposed between the end branch 38 and the core 50 of the suspension lever in order to pre-stress the resilient recoil member 48. In the embodiment shown, this tie-rod 82 is in the form of a rod, one end of which is in the shape of a fork and is articulated to the end branch 38 by a pivot 84 provided with a key 86. This tie-rod 82 passes successively through the washer 74, then a circular opening 88 (FIG. 3) provided in the wing 50. This tie-rod comprises a threaded rod 90 provided with a nut 92 bearing on the wing 50, on the side opposite the resilient recoil member by a washer 94 (FIG. 3). Using the nut 92 it is possible to pre-stress the resilient recoil member 48 in an adjustable manner and thus regulate the degree of shock absorption of this member.

In the embodiment shown, the resilient recoil member 48 is a body made of a rubber-type elastic material. However, the invention is not limited to such an embodiment. It is possible to produce the resilient recoil member in other forms, such as for example a pneumatic or hydraulic jack, an inflatable bladder, a metal spring, particularly a helical spring, etc.

It is also possible, in an alternative feature, to integrate the resilient recoil member directly between the pivot shaft 45 and the suspension lever 40. Thus the expression "resilient recoil member" should be taken in its broadest sense.

As can be seen from the right-hand part of FIG. 1, the respective support arm 32 is produced symmetrically and is also offset towards the inside of the tube in the region that carries the suspension arm 40.

However, in this embodiment, the shaft end 96, which is similar to the shaft end 64 described previously, is produced differently and extends over an axial length that is substantially greater towards the interior of the central tube 14 to allow the assembly of a braking member 98 described hereinafter.

Figure 4:
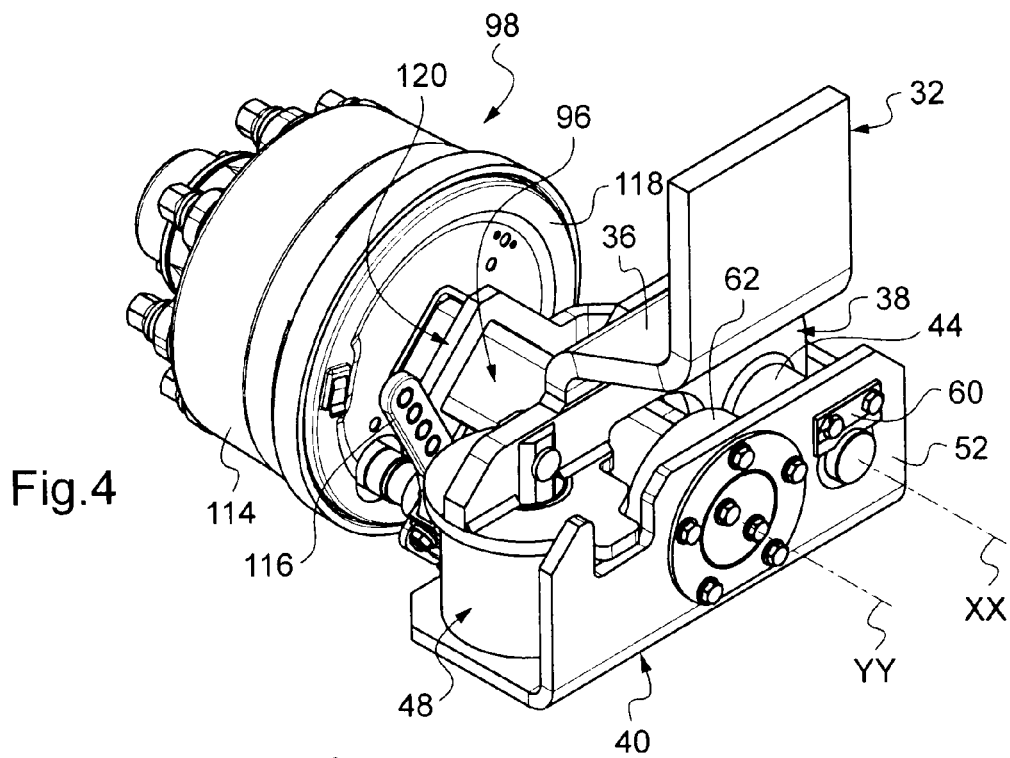
FIG. 4 is a perspective view analogous to FIG. 2, in another configuration, the suspension lever carrying a shaft end equipped with a braking member of the drum type.
Figure 5:
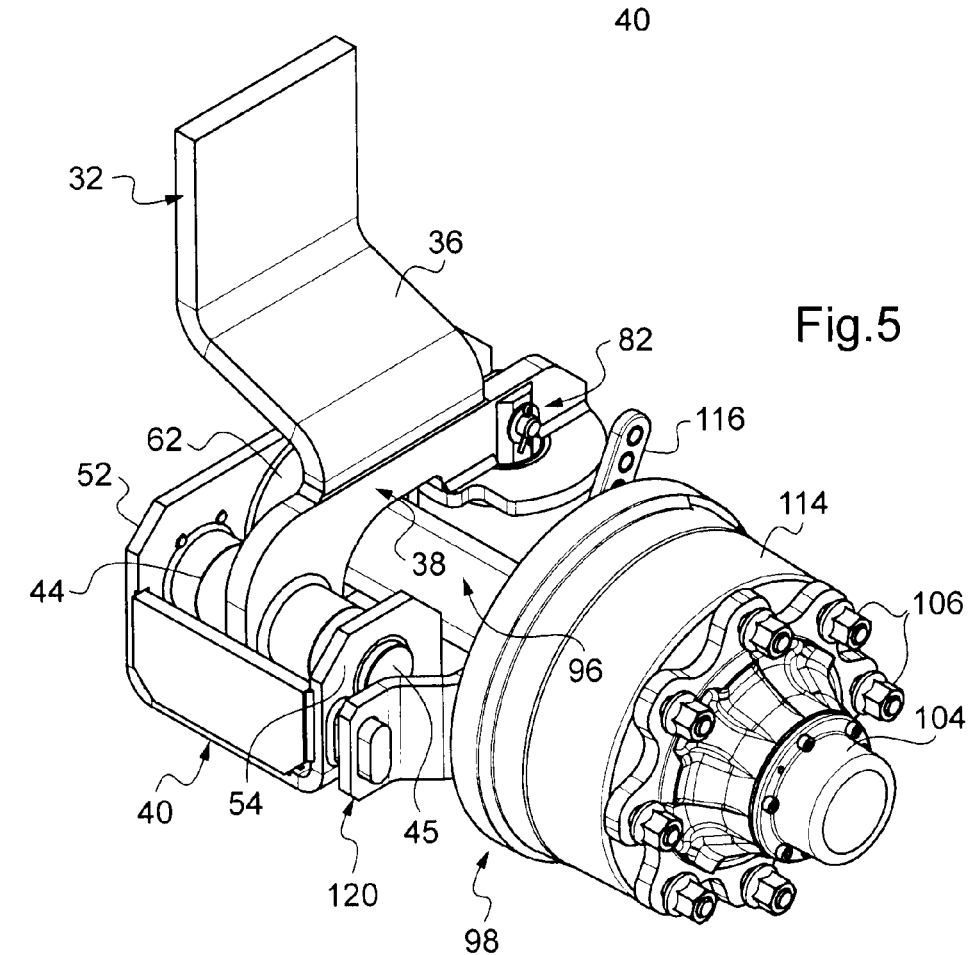
FIG. 5 is another perspective view analogous to FIG. 4 with a section through the axis of the tie-rod passing through the resilient recoil member.

As can be seen from FIGS. 4 and 5, the structure of the end branch 38, the suspension lever 40 and the resilient recoil member 48 is analogous to that described previously for the respective elements located on the left-hand side of FIG. 1. The rotation axes XX and YY are shown in FIG. 4.

FIGS. 1 and 5 show that the wing 52 of the suspension lever 40 is located here substantially in the plane of the ring 20 and not towards the inside of the tube 14. Moreover, unlike the shaft end 64 which is rotatably mounted, the shaft end 96 is fixedly mounted on the respective suspension lever 40 and has a greater axial length than the shaft end 64.

The shaft end 96 has an end 100 accommodated in a swivel joint 101 carried by the wing 52 of the suspension lever 40 and located substantially level with the ring 20. This swivel joint ensures that the shaft end 96 is locked against rotation, with a slight capacity for angular movement. The shaft end 96 has an opposite end 102 which supports, in free rotation, a hub 104 equipped with a series of bolts 106 at its periphery. This allows removable attachment of an annular flange 108 which is itself fixed to lugs 110, analogous to the lugs 72, which are also welded to the inside of the tube 14. The attachment is also carried out using respective bolts. Here again, it is possible, according to an alternative feature, to replace the lugs 110 with a continuous ring. The flange 108 is thus supported in rotation by the shaft end 96 and is removably fixed to the inside of the tube 104. As can be seen from FIG. 1, the lugs 110 are located at a greater distance from the corresponding end of the tube 14 than the lugs 72.

The braking member 98 comprises a drum 114 that is firmly attached to the hub 104. It is a drum brake of conventional structure provided on the inside with linings (not shown) adapted to be set in motion by a control lever 116 (FIGS. 4 and 5) by any suitable control system, notably by a hydraulic or pneumatic control. The braking member 98 further comprises a fixedly mounted flange 118 (FIGS. 1 and 4) through which the shaft end 96 passes, which has a square cross-section in its main part (FIGS. 4 and 5). An anti-rotation plate 120 (FIGS. 4 and 5) is carried by the wing 54 of the suspension lever 40 and has the shaft end 96 passing through it to prevent rotation of the latter. The braking member is controlled by a brake fluid via tubing (not shown) adapted to run along the corresponding arm 32.

In the roller assembly according to the invention, each of the suspension levers 40 preferably extends backwards relative to the first rotation axis XX (pivot shaft 45) and relative to the direction of advance of the roller. This then means that the shaft end 64 or 96 (corresponding to the rotation axis YY of the roller) is located backwards relative to the pivot shaft 45, looking at the direction of advance of the roller. However, it is also possible to provide a reversed embodiment in which the suspension lever extends forwards.

Figure 6:
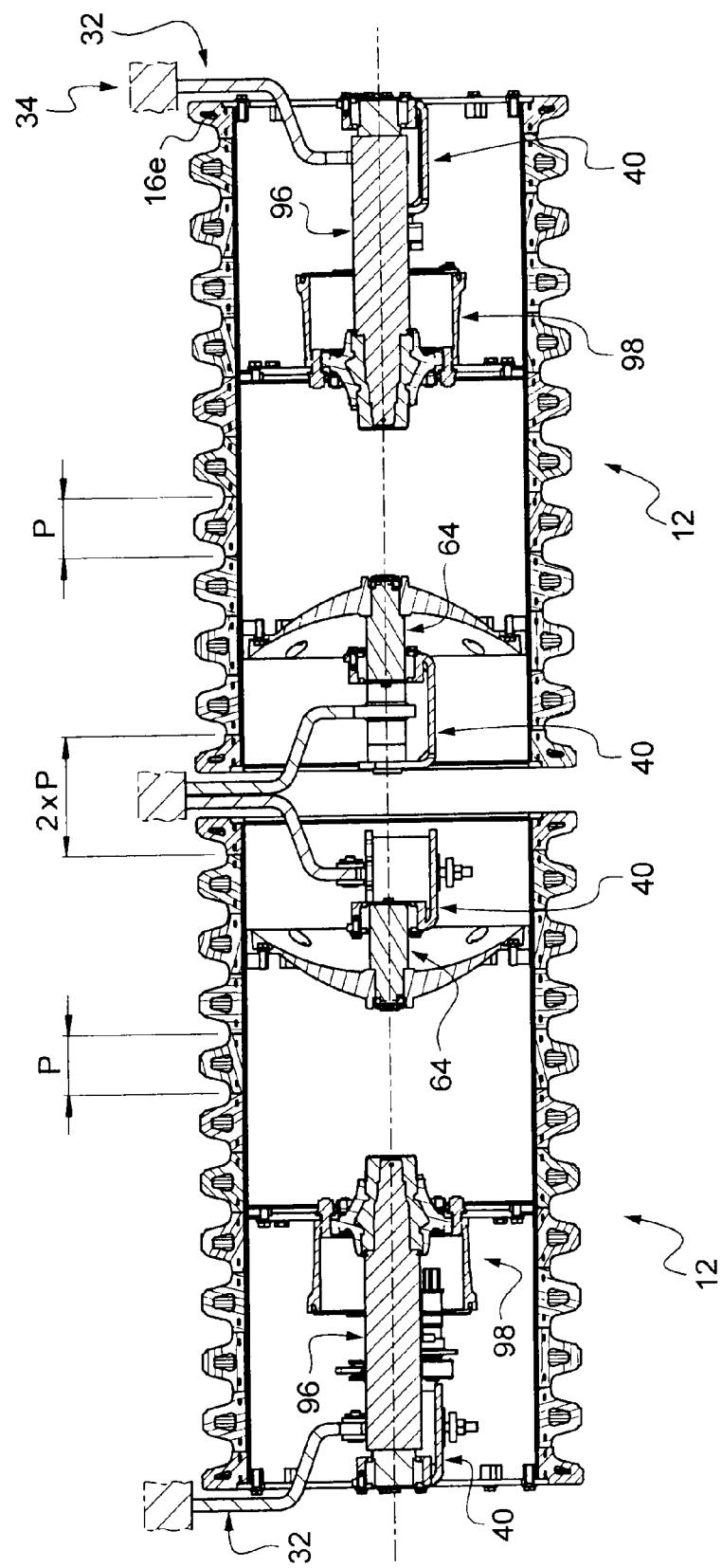
FIG. 6 is an axial section through a roller assembly comprising two rollers analogous to that in FIG. 1, arranged substantially in mutual axial alignment.

Reference will now be made to FIG. 6, which shows a roller assembly 10 comprising two rollers 12 analogous to the one in FIG. 1, each carried by two arms 32 mounted on a common frame 34. Each of these rollers also comprises a braking member 98. These two braking members 98 are disposed, respectively, on the two outer sides of the assembly to make it easier to supply them with brake fluid. Alternatively, it is also possible to arrange them on the two inner sides.

As can be see from FIG. 6, the two rollers 14 are close together. The respective tyres 16 of the two rollers have a constant pitch P in the axial direction, so as to create parallel furrows in the ground. This pitch P also corresponds to the axial width of the tyres (width of the part 22 forming a sheath). The respective profiles of two adjacent tyres 16*e* belonging respectively to the two tubes 14 are spaced at substantially the same pitch in the axial direction. Consequently there is a distance 2P, looking at the outer parts of the two tyres in question, thus making it possible to retain the same pitch P from one roller to the other. This is particularly advantageous for rollers of seed drills.

Thus, in the embodiment in FIG. 6, it is possible to produce two rollers the axial length of which is slightly less than 1.5 meters, to form a complete roller the axial length of which is substantially of the order of 3 meters. This assists with the turning of the roller and reduces friction, compared with a single roller 3 meters wide.

The suspension means integrated inside each roller make it possible to follow the irregularities of the ground, both on open land and on the road, with more or less well-made roadways, and to absorb shocks.

In the embodiment shown, each roller is equipped with a braking member. It is also possible in certain cases to produce a roller with no braking means.

It is also possible to provide two braking members for the same roller.

Moreover, the braking member is not limited to a drum-type brake and other types of brakes may be envisaged, such as disc brakes, in particular.

The invention is particularly useful in rollers of seed drills for agricultural machinery, but is also applicable to other types of rollers, particularly rollers whose tyres define a substantially flat external profile.

The invention claimed is:

1. A roller assembly for an agricultural machine, comprising:
   at least one tube onto which tires are threaded; and
   two arms adapted to support the tube in rotation at both its ends,
   wherein each arm carries a suspension lever housed inside the tube and acted upon by a resilient recoil member, and
   wherein the suspension lever is mounted on the arm so as to be pivotable about a first rotation axis and supports a shaft end which carries a flange fixed to an inside of the tube for the rotation of the tube about a second rotation axis parallel to the first rotation axis.

2. The roller assembly according to claim 1, wherein each arm is deflected towards the inside of the tube, in an axial direction of the tube, in a region that carries the suspension lever.

3. The roller assembly according to one of claims 1 and 2, wherein each arm comprises an end branch having a first end carrying a pivot shaft for rotation of the suspension lever about the first rotation axis and a second end connected to the resilient recoil member.

4. The roller assembly according to claim 3, wherein each suspension lever is in a shape of a beam of generally U-shaped section with a core and two wings, and
　　wherein the pivot shaft passes through the end branch and is received in the two wings of the suspension lever, whereas the resilient recoil member is connected to the core of the suspension lever.

5. The roller assembly according to claim 4, wherein the resilient recoil member is provided with an abutment that engages in a cut-out in one of the wings of the suspension lever.

6. The roller assembly according to claim 4, wherein a tie-rod is interposed between the end branch of the arm and the core of the suspension lever for pre-stressing the resilient recoil member.

7. The roller assembly according to claim 1, wherein the resilient recoil member is a body made of a rubber-type elastic material and the tie-rod passes through the resilient recoil member.

8. The roller assembly according to claim 1, wherein each suspension lever extends backwards with respect to the first rotation axis and relative to a direction of advance of the roller.

9. The roller assembly according to claim 1, wherein the shaft end is rotatably mounted on the suspension lever and is fixedly attached to the flange which is removably fixed to the inside of the tube.

10. The roller assembly according to claim 1, wherein at least one of the suspension levers comprises a braking member for braking the respective flange.

11. The roller assembly according to claim 10, wherein the shaft end is fixedly mounted on the suspension lever and supports the flange in rotation, which is removably fixed to the inside of the tube.

12. The roller assembly according to one of claims 10 and 11, wherein the braking member comprises a drum brake.

13. The roller assembly according to claim 1, wherein the tires threaded onto the tube have respective dome-shaped profiles adapted to form a series of parallel furrows in the ground.

14. The roller assembly according to claim 1, comprising two rollers, the respective tubes of which are arranged in axial alignment and the arms are carried by a common frame.

15. The roller assembly according to claim 13, comprising two rollers, the respective tubes of which are arranged in axial alignment and the arms are carried by a common frame,
　　wherein the respective dome-shaped profiles of the tires threaded onto the two tubes have a constant pitch in an axial direction and the profiles of two adjacent tires belonging to the two tubes respectively are spaced at substantially the same pitch in the axial direction.

\* \* \* \* \*